United States Patent [19]
Lemieux

[11] Patent Number: 6,094,420
[45] Date of Patent: Jul. 25, 2000

[54] BURST CORRELATION DISPERSION MECHANISM FOR A PACKET SWITCHED COMMUNICATIONS SYSTEM

[75] Inventor: Yves Lemieux, Kirkland, Canada

[73] Assignee: Telefonaktiebolaget LM Ericsson, Stockholm, Sweden

[21] Appl. No.: 08/895,733

[22] Filed: Jul. 17, 1997

[51] Int. Cl.[7] .................................................. H04L 12/56
[52] U.S. Cl. ........................... 370/232; 370/253; 370/428
[58] Field of Search ..................................... 370/229, 230, 370/231, 232, 233, 234, 412, 418, 428, 429, 217, 218, 252, 253; 395/200.57, 200.61, 200.65, 200.66

[56] References Cited

U.S. PATENT DOCUMENTS

| | | | |
|---|---|---|---|
| 5,335,222 | 8/1994 | Kamoi et al. ............................ | 370/230 |
| 5,343,465 | 8/1994 | Khalil ..................................... | 370/232 |
| 5,436,889 | 7/1995 | Matsumoto et al. ..................... | 370/385 |
| 5,583,857 | 12/1996 | Soumiya et al. ........................ | 370/233 |
| 5,751,695 | 5/1998 | Ohashi .................................... | 370/218 |
| 5,796,719 | 8/1998 | Peris et al. .............................. | 370/231 |
| 5,828,659 | 10/1998 | Teder et al. ............................. | 370/328 |
| 5,917,804 | 6/1999 | Shah et al. .............................. | 370/230 |

FOREIGN PATENT DOCUMENTS

WO 93/15771   8/1993   WIPO .

OTHER PUBLICATIONS

PCT International Search Report, Jan. 27, 1999, PCT/SE 98/01266.

Primary Examiner—Ajit Patel
Assistant Examiner—Brian Nguyen
Attorney, Agent, or Firm—Jenkens & Gilchrist, P.C.

[57] ABSTRACT

A stream of communications traffic is processed by a time shifting disperser device. The device senses the burstiness of the received stream of communications traffic and stores individual frames of the received stream of communications traffic for a specified time delay calculated as function of the sensed burstiness. Following the calculated delay, the frame traffic is clocked out from the device to be combined with (added to) other streams of communications traffic for transport over a shared media communications link. In instances where each of the plural streams of communications traffic are processed by an associated disperser device, individual time delays are calculated as function not only of the sensed burstiness but also of a delay determined by a transport network management (operation and maintenance) system from noted correlations in bursts between the multiple streams of communications traffic. Coordination of the time shifting operation thus occurs so as to reduce burstiness correlation between the multiple streams of communications traffic.

16 Claims, 4 Drawing Sheets

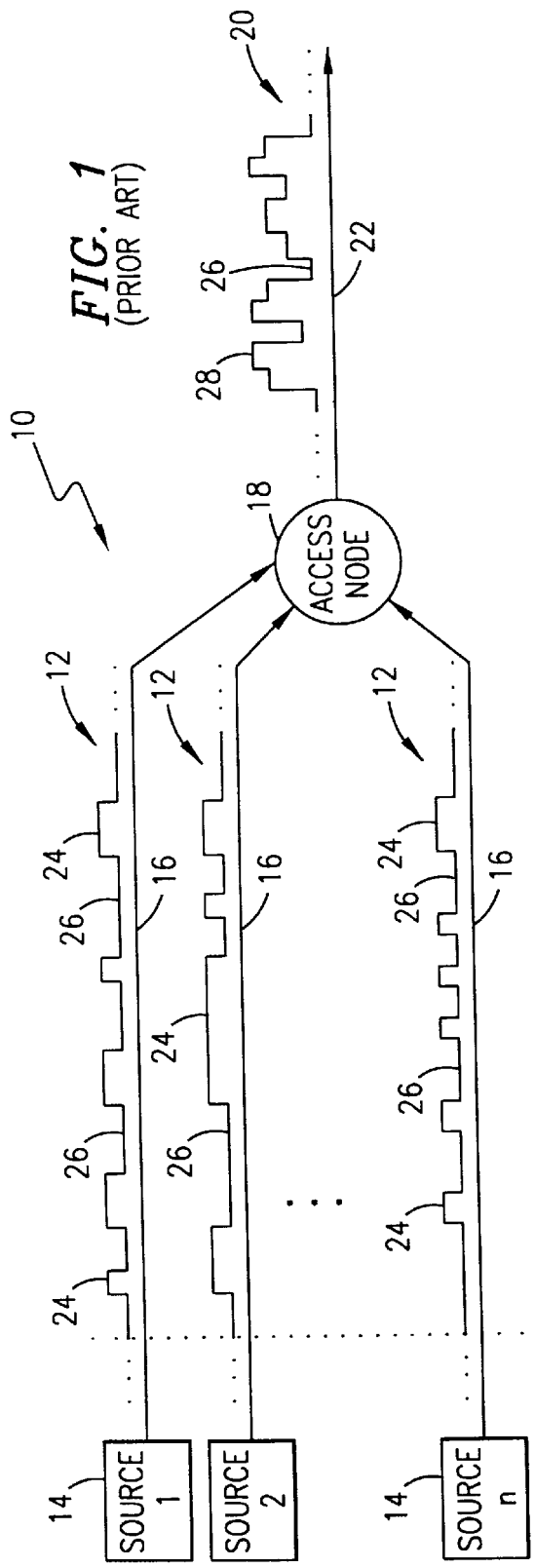
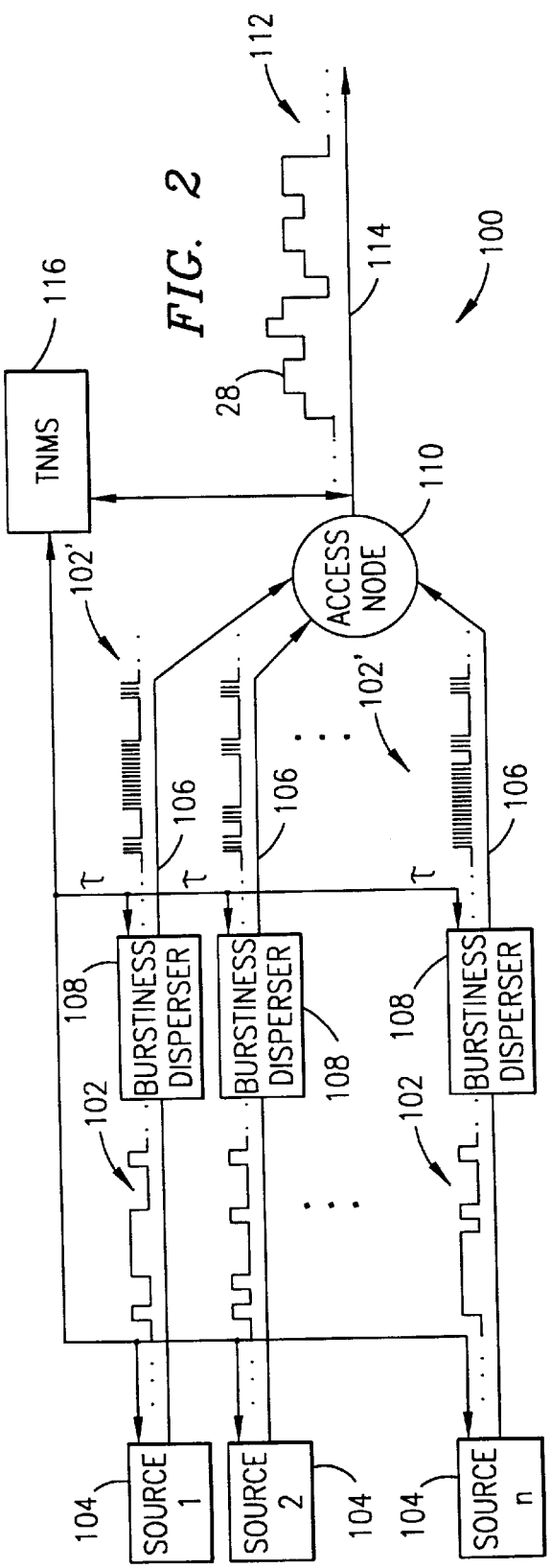

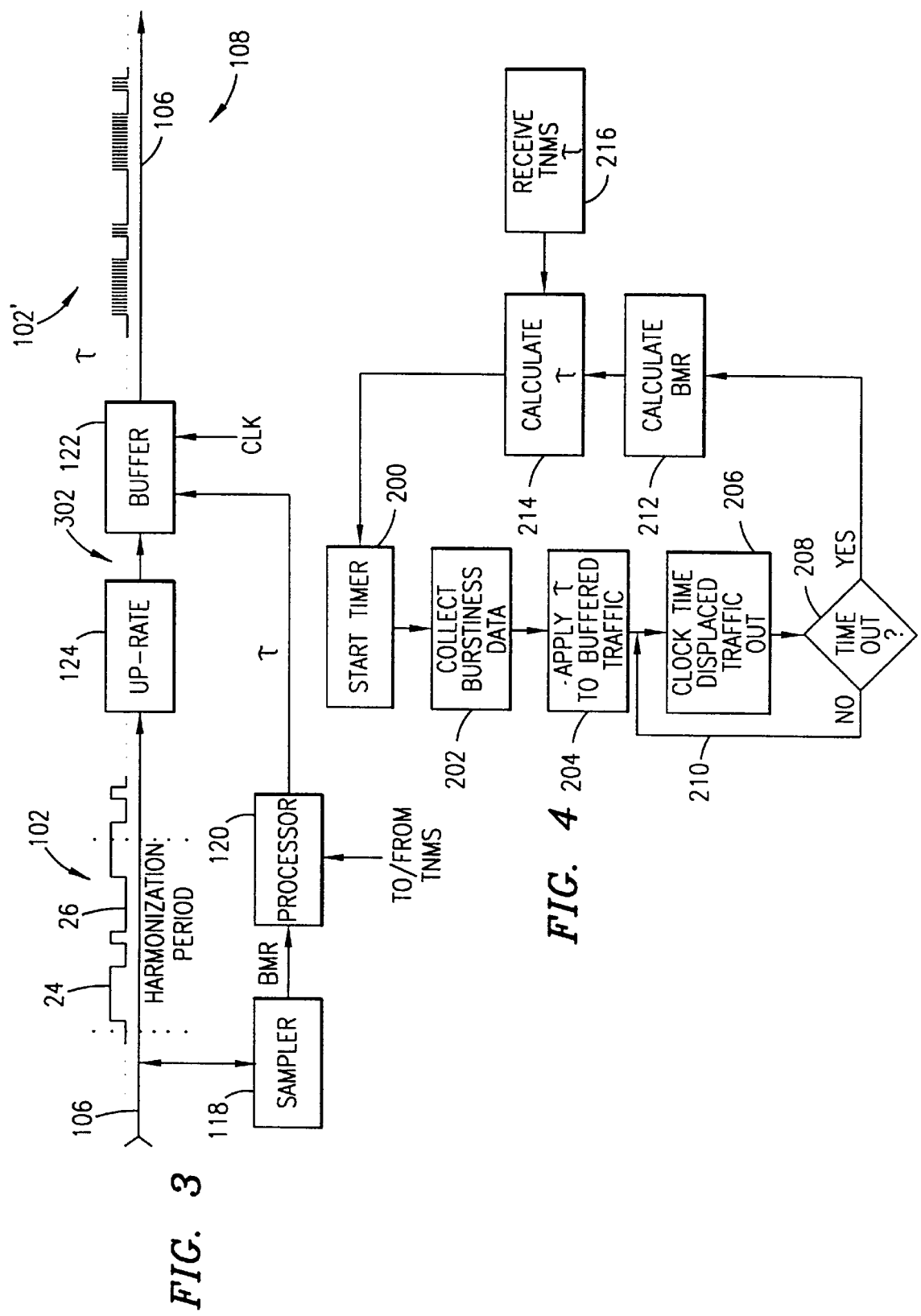

BURST CORRELATION DISPERSION MECHANISM FOR A PACKET SWITCHED COMMUNICATIONS SYSTEM

BACKGROUND OF THE INVENTION

1. Technical Field of the Invention

The present invention relates to packet switching streams of communication traffic onto a common transport network and, in particular, to the dispersion of correlated bursts within packet switched streams of communications traffic.

2. Description of Related Art

Reference is now made to FIG. 1 wherein there is shown a block diagram of a prior art packet switched access communications system 10. It is well known in the art to operate a communications system 10 wherein the streams of communications traffic 12 output from a number of sources 14 and carried by a corresponding number of independent communications links 16 are added together by a packet switched access node 18 into a single packet switched stream of communications traffic 20 carried by a common transport (link) network 22. The conventional data communication system is one example of just such a communications system 10 wherein multiple subscriber voice communications (each comprising a stream of digitized traffic) are added together onto a shared media communications link.

Multimedia traffic (such as internet (data) or video transmission) exhibits a bursty transmission character. By this it is meant that the information being conveyed by the individual streams of communications traffic 12 flows in short bursts 24 with silent, sometimes relatively long, intervals 26 therebetween. Each burst 24 is comprised of at least one frame (not shown) of data. It has been discovered that in instances where several streams of bursty communications traffic 12 are added by node 18 onto a common transport network 22, the bursts 24 in the individual streams may, when the same traffic types are combined, correlate with each other in the output packet switched stream of communications traffic 20. Thus, the individual bursts 24 add into cumulative bursts 28. If the cumulative burst approaches or exceeds the transmission capacity of the common transport network 22, instances of network congestion may arise. There is a need then for a mechanism to break down or disperse the correlation between individual bursts 24 in added streams of bursty communications traffic 12.

SUMMARY OF THE INVENTION

In a first embodiment of the present invention, a disperser senses the burstiness of a received stream of communications traffic comprised of a plurality of frames. A buffer then stores the received frames in the stream of communications traffic for a specified time delay calculated as function of the sensed burstiness. The delayed (i.e., time shifted) stored frames of the communications traffic are then output from the buffer.

In another embodiment of the present invention, multiple streams of communications traffic are processed by corresponding multiple dispersers. Each disperser senses burstiness of its received stream, and calculates a specified time delay, to be applied to the frames, which is calculated as function of not only of the sensed burstiness but also of a delay determined by a transport network management (operation and maintenance) system determined from noted correlations in bursts between the multiple streams of communications traffic. In this regard, the transport network management system coordinates to a degree the operation of the individual dispersers to burstiness correlation between the multiple streams of communications traffic.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 (previously described) is a block diagram of a prior art packet switched communications system;

FIG. 2 is a block diagram of a packet switched communications system of the present invention;

FIG. 3 is a block diagram of a burstiness disperser in accordance with the present invention;

FIG. 4 is a flow diagram illustrating operation of the burstiness disperser of the present invention;

DETAILED DESCRIPTION OF THE DRAWINGS

Figure 6:
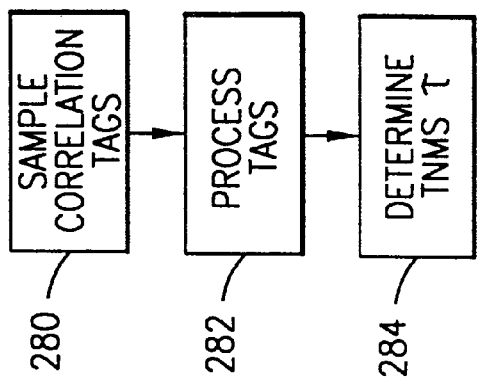
FIG. 6 is a flow diagram illustrating operation of the transport network management system of the present invention.

Reference is now made to FIG. 2 wherein there is shown a block diagram of a packet switched communications system 100 of the present invention. Streams of bursty communications traffic 102 are output from a number of sources 104 and carried by a corresponding number of independent communications links 106. By bursty it is meant that the frames (not shown) of information being conveyed by the individual streams of communications traffic 102 flows in short bursts 24 with silent, sometimes relatively long, intervals 26 therebetween. Each of the communications links 106 includes a burstiness disperser 108 which functions to time shift frames within a received stream of communications traffic 102 generated by a source 104. The time shifted frames (not shown) comprising the streams of communications traffic 102' output from each burstiness disperser 108 are added together by a packet switched access node 110 into a single packet switched stream of communications traffic 112 carried by a common transport (link) network 114.

It is known that when adding several similar (i.e., of the same traffic type) streams of bursty communications traffic 102 onto a common transport network 114, the bursts 24 in the individual streams may, when the same traffic types are combined, correlate with each other in the output packet switched stream of communications traffic 112. Adverse congestion on the common transport network 114 may result from this correlation. The time shifting (temporal dispersion, intervention or correction) function implemented by the burstiness disperser 108 advantageously acts to break down or disperse the correlation between individual bursts 24 (and, in particular, individual frames) in added streams of bursty communications traffic 102.

The time shift $\tau$ applied by each burstiness disperser 108 to frames of its received stream of bursty communications traffic 102 may comprise a random or pseudo-random duration time shift $\tau_r$. Alternatively, the time shift $\tau$ applied by each burstiness disperser 108 to frames of its received stream of bursty communications traffic 102 may comprise a time shift $\tau_{tnms}$ with a duration specified by a transport network management system (TNMS) 116 configured to monitor communications over the common transport network 114. Still further, the time shift τ applied by each burstiness disperser 108 to frames of its received stream of bursty communications traffic 102 may comprise the random or pseudo-random duration time shift $\tau_r$ in addition to the time shift $\tau_{tnms}$ with a duration specified by the transport network management system 116. The applied time shift τ is typically, but not necessarily, different for each burstiness disperser 108.

Reference is now made to FIG. 3 wherein there is shown a block diagram of the burstiness disperser 108 of the present invention. A burstiness sampler 118 monitors the stream of bursty communications traffic 102 output from source 104 and carried by the independent communications link 106. A calculation is made, once for each repetitive time period (referred to herein as the "harmonization period"), of the burstiness measurement ratio (BMR) for the stream of bursty communications traffic 102 in accordance with the following equation:

$$BMR = \frac{\beta + \alpha}{\alpha} \quad (1)$$

wherein:

$$\beta = \frac{1}{\text{time on}}, \text{ and } \alpha = \frac{1}{\text{time off}}.$$

The "time on" portion refers to the length of time within the harmonization period that bursts 24 in the stream of bursty communications traffic 102 occur. The "time off" portion refers to the length of time within the harmonization period that silent intervals 26 in the stream of bursty communications traffic 102 occur. Relatively non-bursty traffic such as voice traffic results in a BMR value of close to one, while relatively bursty traffic such as internet (data) and video traffic results in a BMR value of much greater than one (e.g., greater than three).

The burstiness sampler 118 calculated BMR value is transmitted to a processing unit 120 where it is used to calculate the time shift τ. In one embodiment, a random or pseudo-random duration time shift $\tau_r$ is specified for the burstiness disperser 108, and the time shift τ is determined in accordance with the following equation:

$$\tau = \tau_r \cdot BMR \quad (2)$$

In another embodiment, a time shift $\tau_{tnms}$ with a duration calculated by the transport network management system is specified for the burstiness disperser 108, and the time shift τ is determined in accordance with the following equation:

$$\tau = \tau_{tnms} \quad (3)$$

In yet another embodiment, both a random or pseudo-random duration time shift $\tau_r$ and a time shift $\tau_{tnms}$ with a duration calculated by the transport network management system are specified for the burstiness disperser 108, and the time shift τ is determined in accordance with the following equation:

$$\tau = (\tau_r \cdot BMR) + \tau_{tnms} \quad (4)$$

The determined time shift τ is then applied by the burstiness disperser 108 to frames of its received stream of bursty communications traffic 102 (in a manner to be described) to break down or disperse any correlation between the individual bursts 24 in the bursty communications traffic 102 processed by the instant burstiness disperser and the individual bursts in the bursty communications traffic processed by other burstiness dispersers.

The burstiness disperser 108 further includes a buffer 122 providing a temporary storage area for the frames of the bursty communications traffic 102 received on (input from) the independent communications link 106. The buffer further receives the time shift τ determined by the processing unit 120, as well as a clock signal (CLK) timed at the transmission rate of the destination common transport network 114 (FIG. 2) After imposing the temporal dispersion, intervention or correction specified by the processing unit 120 determined time shift τ, the buffer 122 then clocks out the stored frames of the bursty communications traffic 102 at the negotiated rate specified by the clock signal onto the communications link 106 to generate the time shifted stream of communications traffic 102'.

In order to effectively implement the time shift on the stored frames, it may be necessary to effectuate an up-rating 124 of the received bursty communications traffic 102. When such occurs, the up-rating is typically selected to match a transmission rate for the destination common transport network. A more detailed explanation of the up-rating operation, as well as the time shifting operation, is provided herein with respect to FIG. 7.

Reference is now once again made to FIG. 2. Each burstiness disperser 108 may operate independently of other burstiness dispersers included in the system 100 to break down or disperse any correlation between the individual bursts 24 (and, in particular, frames) in the streams of bursty communications traffic 102. In independent operating mode, the first embodiment for calculating the time shift τ as a function of the burstiness measurement ratio and a designated random or pseudo-random duration time shift $\tau_r$ (see, Equation 2) is implemented. Alternatively, the plural burstiness dispersers 108 included in the system 100 may operate in conjunction with each other under the direction of the transport network management system 116 to break down or disperse any correlation between the individual bursts 24 in the streams of bursty communications traffic 102. In this shared operating mode, the second and third embodiments for calculating the time shift τ as a function of the burstiness measurement ratio, a designated random or pseudo-random duration time shift $\tau_r$ and/or a designated time shift $\tau_{tnms}$ with a duration calculated by the transport network management system 116 (see, Equations 3 and 4) are implemented. The time shift $\tau_{tnms}$ specified by the transport network management system 116 need not, however, be applied by the burstiness disperser 108 if the processed stream of bursty communications traffic 102 is sensitive to time delays. An example of this would be voice communications and certain types of data communications. The transport network management system 116 is accordingly connected to each of the sources 104 in order to receive an indication therefrom concerning the time delay sensitivity of the transmitted traffic.

To effectuate the shared operating mode, the transport network management system 116 monitors the time shifted streams of communications traffic 102' carried by the communication link 106 to the access node 110 to identify instances of correlation between the bursts 24 (and frames therein) of the plural streams. The transport network management system 116 further monitors the single packet switched stream of communications traffic 112 carried by a common transport (link) network 114 output from the access node 110 to identify instances of excessive correlation indicated by bursts 28 in the single stream which may result in network congestion. This monitoring may also detect instances of congestion at the access node 110. Responsive to these analyses, the transport network management system 116 determines and generates time shifts $\tau_{tnms}$ for all or only certain ones of the included burstiness dispersers 108 which serve to break down or disperse any correlation between the individual bursts 24 in the streams of bursty communications traffic 102 (and perhaps address congestion issues). Again, for time sensitive communications traffic, as determined from source 104 communication with the transport network management system, the generated time shift $\tau_{tnms}$ may be ignored.

Reference is now made to FIG. 4 wherein there is shown a flow diagram illustrating operation of the burstiness disperser of the present invention. In step 200, a timer is started. This timer measures the length of the harmonization period. Burstiness data is then collected by the sampler in step 202. At the same time, a time shift $\tau$, calculated in part from the burstiness data collected during a prior harmonization period, is applied in step 204 to the buffered frames of the stream of bursty communications traffic. In conjunction with the application (and expiration) of the time shift, time displaced traffic is clocked out of the burstiness disperser in step 206 as the time shifted stream of communications traffic. A test is then made in decision step 208 as to whether the timer has expired. If not, the process loops back 210 to repeat steps 206 and 208. If the timer has expired, this is indicative of the fact that the harmonization period has also expired. The collected burstiness data for the expired harmonization period is then processed in step 212 to calculate a new burstiness measurement ratio (Equation 1). The time shift $\tau$ for the next harmonization period is then calculated in step 214. For the first embodiment, the time shift $\tau$ is calculated in step 214 as a function of the burstiness measurement ratio and a designated random or pseudo-random duration time shift $\tau_r$ (see, Equation 2). For the second and third embodiments, the time shift $\tau$ is calculated in step 214 as a function of the burstiness measurement ratio, a designated random or pseudo-random duration time shift $\tau_r$, and/or a designated time shift $\tau_{tnms}$ with a duration calculated by the transport network management system and received in step 216 (see, Equations 3 and 4). The process then returns to step 200 to implement the newly calculated time shift $\tau$ for the next harmonization period.

Figure 5:
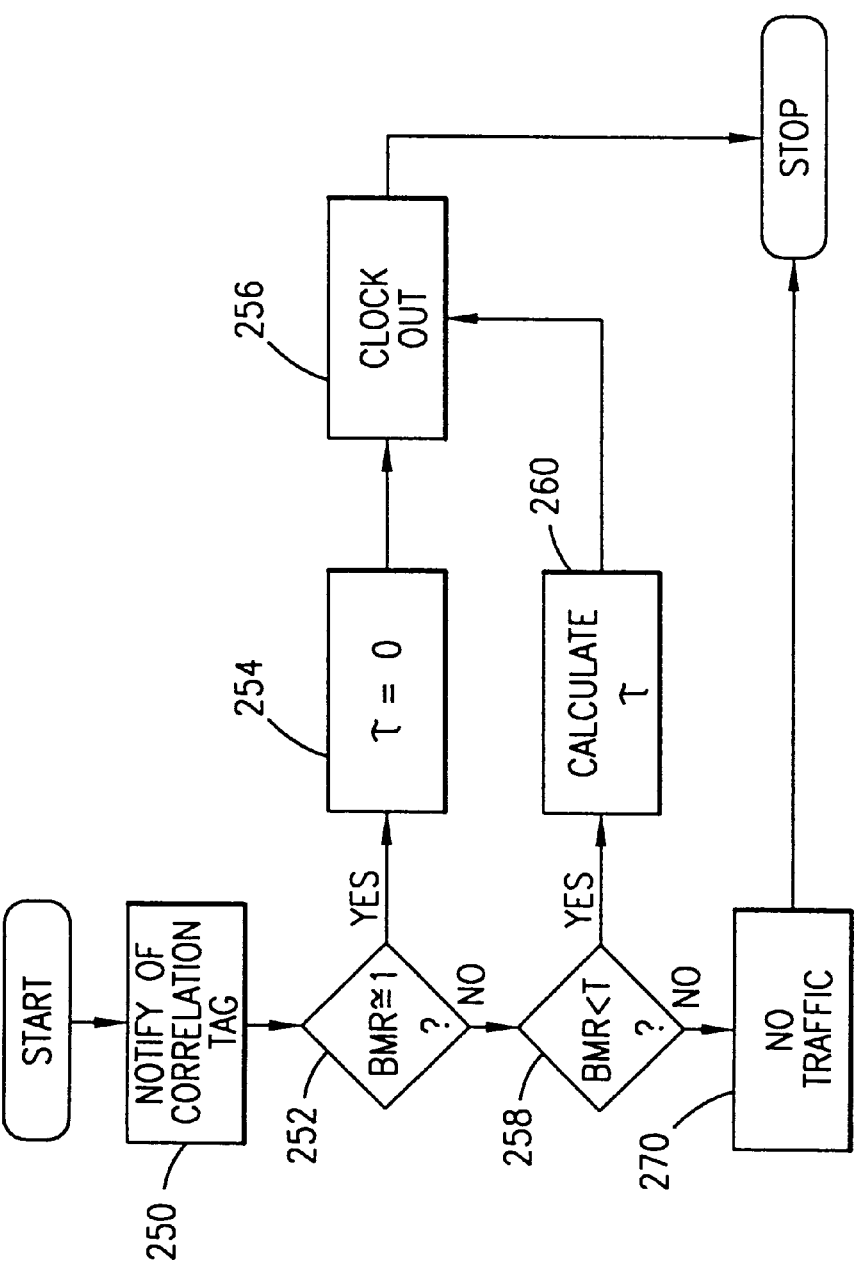
FIG. 5 is a flow diagram illustrating further detailed operation of the burstiness disperser of the present invention.

Reference is now made to FIG. 5 wherein there is shown a flow diagram illustrating further detailed operation of the burstiness disperser of the present invention. In step 250, each burst (24, FIG. 3) in the received stream of bursty communications traffic is assigned a correlation tag, and the transport network management system is informed of the received burst and tag. The transport network management system is similarly receiving correlation tags from other burstiness dispersers, and by comparing the times of the correlation tagged bursts (as will be described below), instances of unacceptable correlation may be identified. Next, in decision step 252, a determination is made as to whether the calculated burstiness measurement ratio (212, FIG. 4) is approximately (i.e., very closely) equal to one. If so, this is indicative of the fact that the stream of communications traffic is not relatively bursty, and in fact is likely to be a voice communication. The time shift $\tau$ for the communications traffic is set to zero in step 254 because voice communications are time sensitive communications, and the traffic is clocked out of the buffer in step 256 at the appropriate rate for the destination common transport network. If the burstiness measurement ratio is not approximately equal to one, a determination is made in decision step 258 as to whether the burstiness measurement ratio is less than a certain threshold (T). If so, this is indicative of the fact that the stream of communications traffic is relatively bursty, and is likely internet (data) or video type traffic. The time shift $\tau$ for the communications traffic is then calculated in step 260 using the appropriate one of Equations 2, 3 or 4, and the frames of the traffic are clocked out of the buffer in step 256 following the time shift and at the appropriate rate for the destination common transport network. If the burstiness measurement ratio exceeds the threshold (T), this is indicative of the fact that no communications traffic is being processed. An appropriate notification is then provided to the transport network management system in step 270 that the traffic is off.

Reference is now made to FIG. 6 wherein there is shown a flow diagram illustrating operation of the transport network management system of the present invention. In step 280, the different correlation tags associated with both the plural streams of communications traffic (received by the burstiness dispersers) and the single packet switched stream of communications traffic (output from the access node) are sampled. These tags identify a number of things, including, the source of each burst and the relative timing of each burst in comparison to other bursts. The correlation tags are then processed by the transport network management system in step 282 to identify instances of unacceptable correlation. There are two aspects of such correlation which are determined and taken into consideration. The first is correlation in time between individual bursts of the plural streams of communications traffic received by the burstiness dispersers. The second is correlation in time between cumulative bursts in the single packet switched stream of communications traffic output from the access node. As a result of finding instances of unacceptable correlation, the transport network management system determines in step 284 a designated time shift $\tau_{tnms}$ for each of the included burstiness dispersers. The designated value is then utilized by the receiving burstiness disperser in conjunction with Equations 3 and 4 to calculate the time shift $\tau$ (214, FIG. 4; 260, FIG. 5) for application to the received stream of bursty communications traffic. The calculated time shifts $\tau_{tnms}$ are valid for one harmonization period, and are thus recalculated with each harmonization period expiration.

Figure 7:
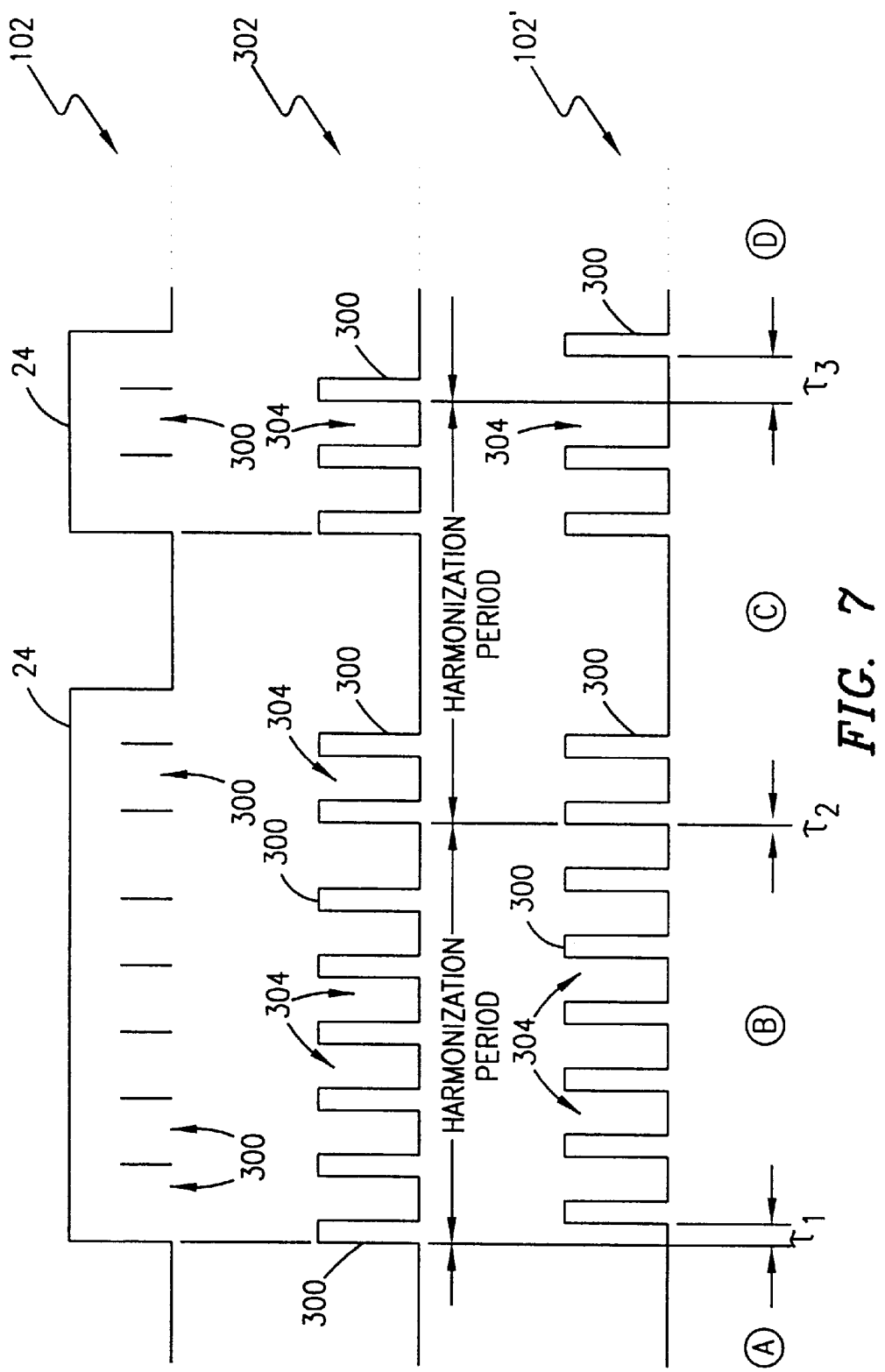
FIG. 7 is a timing diagram illustrating up-rating and time shifting operations performed by the burstiness disperser of the present invention.

Reference is now made to FIG. 7 wherein there is shown a timing diagram illustrating the up-rating and time shifting operations performed by the burstiness disperser of the present invention. The received stream of bursty communications traffic 102 includes a number of bursts 24 where each burst is comprised of at least one, and more likely a plurality, of frames 300. The up-rating performed on the received stream of bursty communications traffic 102 effectively compresses in time each individual frame 300 to generate an up-rated stream of bursty communications traffic 302. By compressing the individual frames 300 in this fashion, and inter-frame period 304 is created between consecutive frames. This inter-frame period 304 provides space within which the compressed (up-rated) frames 300 of other up-rated streams of bursty communications traffic 302 may be inserted by the access node with respect to the generation of the single packet switch stream of communications traffic 112 with minimal instances of correlation and reduced congestion.

The compressed (up-rated) frames 300 are buffered (stored) by the burstiness disperser. Based on the determined burstiness measurement ratio during harmonization period "A", a time shift $\tau_1$, calculated in accordance with Equations (2), (3) or (4), is applied to the compressed and buffered frames 300 of the up-rated stream of bursty communications traffic 302 during a next harmonization period "B" to output (i.e., clock out) the time shifted stream of communications traffic 102'. The time shift is typically calculated to be equal to some integer multiple of the width of the compressed (up-rated) frames 300. Similarly, a time shift $\tau_2$ is calculated from the determined burstiness measurement ratio during harmonization period "B" for application to the compressed and buffered frames 300 of the up-rated stream of bursty communications traffic 302 during the harmonization period "C". In this instance, it is illustrated that the time shift $\tau_2$ is zero, indicating that no shift is needed to relieve possible or actual instances of burst (frame) correlation. Furthermore, a time shift $\tau_3$ is calculated from the determined burstiness measurement ratio during harmonization period "C" for application to the compressed and buffered frames 300 of the up-rated stream of bursty communications traffic 302 during the harmonization period "D". This process is repeated as shown in FIGS. 4, 5 and 6 over successive harmonization periods.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A disperser device, comprising:
   a sampler for sampling a received stream of communication traffic, the received stream including frames;
   means for calculating a burstiness measurement ratio for the sampled stream of communication traffic;
   a processor for calculating a time delay based on the calculated burstiness measurement ratio for which individual frames of the received stream of communications traffic should be temporarily stored prior to output;
   a buffer for temporarily storing the received stream of communications traffic, the buffer outputting stored individual frames of the received stream of communications traffic from the buffer following expiration of the processor calculated time delay based on the burstiness measurement ratio.

2. The disperser device as in claim 1 wherein the time delay is substantially zero if the burstiness measurement ratio is substantially equal to one.

3. The disperser device as in claim 1 wherein the received stream of communications traffic is segmented into a repeating harmonization period, and wherein the time delay calculated from the burstiness measurement ratio of traffic in a first harmonization period is applied to delay individual frame output during a second harmonization period.

4. The disperser device as in claim 1 wherein the buffer further controls output of individual temporarily stored frames of the received stream of communications traffic in accordance with the time delay calculated not only based on the burstiness measurement ratio but also based on any noted correlation between bursts of the received stream of communications traffic and bursts of other streams of communications traffic.

5. A data communications system, comprising:
   a first stream of communications traffic;
   a second stream of communications traffic that is non-redundant of the first stream, each first and second stream including frames;
   a disperser for each stream of communications traffic, each disperser operating to receive one of the first and second streams of communications traffic, measure burstiness in the received stream of communications traffic and note correlation between bursts of the first and second streams of communications traffic, each disperser further operating to calculate a time delay that individual frames within the received one of the first and second streams of communications traffic should be temporarily stored prior to output based on the measured burstiness and noted correlation, each disperser still further operating to temporarily store and then output from storage the individual frames in accordance with the calculated time delay; and
   a packet switched access node for receiving the frame delayed first and second streams of communications traffic output from the dispersers, the access node combining the received first and second streams of communications traffic together for output as a packet switched stream of communications traffic on a shared media communications link.

6. The data communications system as in claim 5 further including an operation and maintenance system operable to monitor the first and second streams of communications traffic and the output packet switched stream of communications traffic to detect instances of noted burst correlation between the streams and specify a time shift comprising a part of the calculated time delay for each disperser to effectuate a dispersion of noted burst correlation.

7. The data communications system as in claim 5 wherein each disperser comprises:
   a sampler for sampling the received stream of communications traffic;
   means for calculating a burstiness measurement ratio of the sampled stream of communications traffic; and
   a processor for calculating a time shift based on the burstiness measurement ratio, the time shift comprising a part of the time delay for that disperser.

8. The data communications system as in claim 7 wherein the time shift is substantially zero if the burstiness measurement ratio is substantially equal to one.

9. The data communications system as in claim 5 wherein each of the first and second streams of communications traffic is segmented into a repeating harmonization period, and wherein the time delay calculated from the measured burstiness and noted burst correlation of traffic in a first harmonization period is applied to delay individual frame output during a second harmonization period.

10. A method for processing a received stream of communications traffic to disperse burst correlation, comprising the steps of:
   sampling a received stream of communications traffic, the stream including frames;
   calculating a burstiness measurement ratio of the sampled stream of communications traffic;
   calculating a time delay based on the calculated burstiness measurement ratio for which individual frames of the received stream of communications traffic should be temporarily stored prior to output;
   temporarily storing the received stream of communications traffic and then outputting individual frames of the received stream of communications traffic following expiration of the calculated time delay based on the burstiness measurement ratio.

11. The method as in claim 10 wherein the time delay is substantially zero if the burstiness measurement ratio is substantially equal to one.

12. The method as in claim 10 wherein the received stream of communications traffic is segmented into a repeating harmonization period, and wherein the time delay calculated from the burstiness measurement ratio of traffic in a first harmonization period is applied in the step of outputting to delay individual frame output during a second harmonization period.

13. The method as in claim 10 wherein the step of outputting further comprises the step of outputting individual frames of the received stream of communications traffic in accordance with the time delay calculated not only based on the burstiness measurement ratio but also based on any noted correlation between bursts of the received stream of communications traffic and bursts of other streams of communications traffic.

14. A method for processing first and second non-redundant received streams of communications traffic to disperse burst correlation, comprising the steps of:

measuring instances of burst correlation between the first and second streams of communications traffic, each stream including frames;

measuring a burstiness of each individual first and second stream of communications traffic;

calculating a time delay that individual frames of each of the first and second streams of communications traffic should be temporarily stored prior to output based on the measured burstiness and burst correlation; and temporarily storing and then outputting from storage the individual frames of the first and second streams of communications traffic in accordance with the calculated time delay.

15. The method as in claim 14 further including the step of combining the received plurality of time shifted first and second streams of communications traffic together for output as a packet switched stream of communications traffic.

16. The method as in claim 14 wherein each of the first and second received streams of communications traffic is segmented into a repeating harmonization period, and wherein the time delay calculated from the measured burstiness and burst correlation of traffic in a first harmonization period is applied to delay frame output during a second harmonization period.

* * * * *